United States Patent [19]

Mendelsohn et al.

[11] Patent Number: 4,485,719

[45] Date of Patent: Dec. 4, 1984

[54] RESILIENT HIGH MODULUS POLYURETHANE ELASTOMER

[75] Inventors: Morris A. Mendelsohn, Wilkins Township, Allegheny County; Francis W. Navish, Jr., East Pittsburgh; George E. Rudd, Murrysville, all of Pa.

[73] Assignee: Westinghouse Electric Corp., Pittsburgh, Pa.

[21] Appl. No.: 366,457

[22] Filed: Apr. 8, 1982

[51] Int. Cl.$^3$ .................. C08G 18/83; F16J 15/32
[52] U.S. Cl. ............................. 89/1.816; 528/66; 528/77
[58] Field of Search .................. 528/66, 77; 89/1.816

[56] References Cited

U.S. PATENT DOCUMENTS 4,033,593  7/1977  Molnar et al. ............... 277/212

OTHER PUBLICATIONS

Mendelsohn, M. A. et al, "Chemical & Engineering Properties of Polyurethane Isolator Pads" I & E.C. Prod. Res. & Dev. vol. 14, 181–189 (1975).
Mendelsohn, M. A. et al, "Polymer Composition & Structural Design" I & E.C. Prod. Res. & Dev., vol. 10, 14–25 (1971).
May, C. A. ed. for *Resins for Aerospace*, ACS publication, 151–200 (1980).
Wright, P. et al, *Solid Polyurethane Elastomers*, 38–63, 72–79 (1969).

*Primary Examiner*—Veronica P. Hoke
*Attorney, Agent, or Firm*—D. P. Cillo

[57] ABSTRACT

A resilient, strong, high modulus polyurethane elastomer structural member is made from (A) a prepolymer prepared from a composition consisting essentially of 4,4'-diphenylmethane diisocyanate, low molecular weight triol, and polyoxytetramethylene glycol, and (B) hydroquinone di-(β-hydroxyethyl) ether, as a chain extender.

11 Claims, 4 Drawing Figures

RESILIENT HIGH MODULUS POLYURETHANE ELASTOMER

GOVERNMENT CONTRACT

The Government has rights in this invention pursuant to Contract No. F04704-78-C-0016 awarded by the U.S. Department of Defense.

BACKGROUND OF THE INVENTION

Elastomeric materials have long been used to make shock isolator pads and launch seals for missiles. The shock isolator pads usually employ prebuckled struts to support the missile in its launch tube, provide shock mitigation, and damp vibrations. The launch seals are employed near the firing end of the missile, and must exhibit enough strength and rigidity to retain the pressure generated by the launch gases, i.e., up to about 320 lb./sq.in. at a $3\frac{1}{2}$ in. missile-launch tube gap, and not invert (flip) during launch. The launch seals must also exhibit sufficient resiliency so that they can accommodate certain axial and radial displacements of the missile, eccentricities of the launch tube and missile, and intermittent variations in the width of the annular space between the missile and the launch tube, as described by Molnar et al., in U.S. Pat. No. 4,033,593.

Tolylene diisocyanate terminated polyoxytetramethylene based prepolymers, such as Adiprene L-100 or L-167, extended with 4,4'-methylenebis (orthochloroaniline)-MOCA- have been used in the manufacture of both of these structural members, as taught by Mendelsohn et al. in *I&EC Product Research & Development*, Vol. 10, p. 14–25, March 1971 and Vol. 14, p. 181–189, September 1975, and by Meier et al. in *Resins for Aerospace*, C. A. May Editor, ACS Symposium Series 132, American Chemical Society, Chapters 14 and 15, Washington, 1980. Both the tolylene diisocyanate and the 4,4'-methylenebis (orthochloroaniline), however, are now believed to present toxicologic problems. Thus, there is a need for substitute polyurethane elastomers that can be utilized in the manufacture of shock isolator pads and launch seals that will be in circumferential contact with launchable missiles.

SUMMARY OF THE INVENTION

The above problems have been solved, and the above needs met, by providing a very tough, strong, high modulus, resilient, extensible, crack resistant, polyurethane elastomer, made from materials which present no toxicologic problems. This polyurethane elastomer can be used to make annular missile launch seals and certain types of shock isolator pads.

The polyurethane elastomer is a specifically formulated material consisting essentially of the cured admixture of (A) a polyurethane prepolymer of a 4,4'-diphenylmethane diisocyanate terminated polyether, and (B) hydroquinone di-(β-hydroxyethyl) ether, used as a sole chain extender. The prepolymer is preferably a 4,4'-diphenylmethane diisocyanate terminated polyoxytetramethylene diol-trimethylol propane based prepolymer. The prepolymer and chain extender are both preferably degassed, heated, admixed, and poured into a heated mold at between about 100° C. and 120° C. After removal from the mold, the polyurethane elastomer may be post-cured. With this composition, mold dwell time is very low, adding to the economies of processing, and pressure retention and resiliency of the resultant seals are outstanding.

BRIEF DESCRIPTION OF THE DRAWINGS

For a better understanding of the invention, reference may be made to the preferred embodiment, exemplary of the invention, shown in the accompanying Drawings in which.

DESCRIPTION OF THE PREFERRED EMBODIMENTS

Figure 1:
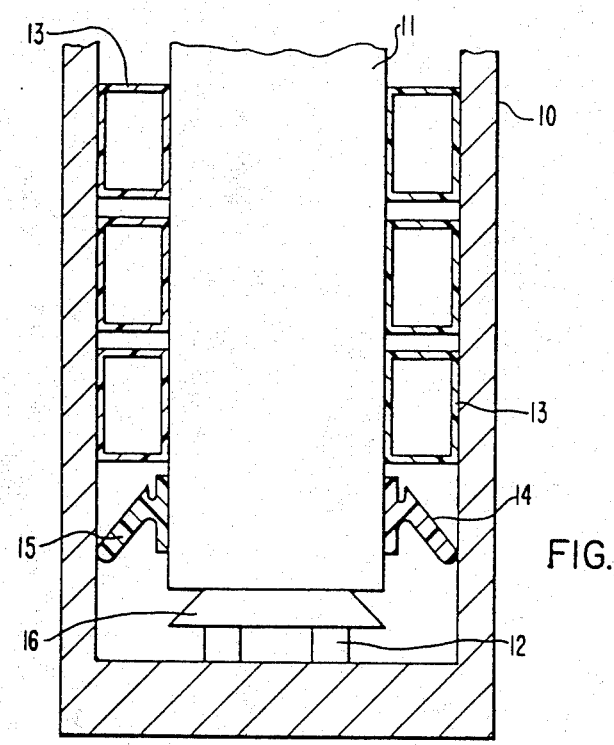
FIG. 1 shows a schematic illustration of missile mounted isolator pads and launch seals in circumferential contact with a missile and a launch tube, where the missile is at rest.

Reaction of an isocyanate and an alcohol results in the formation of a urethane:

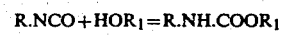

$$R.NCO + HOR_1 = R.NH.COOR_1$$

By the same reaction, polyhydroxyl materials will react with polyisocyanates to yield polyurethanes. These polyurethanes are well known in the art, and a detailed description of their synthesis can be found in *Plastics Materials*, by J. A. Brydson, D. Van Nostrand Co., 1966, pp. 484 to 504.

The isocyanate used is 4,4'-diphenylmethane diisocyanate, i.e., p,p'-diphenylmethane diisocyanate. This is the only isocyanate useful in the elastomer. It has an extremely low vapor pressure, about 1/10 that of tolylene diisocyanate, and is thus much less hazardous. It also adds much more resiliency and has a higher recovery after distortion than tolylene diisocyanate, because of its molecular symmetry.

The polyol used is polyoxytetramethylene glycol, a dihydric alcohol, i.e., HO—$CH_2CH_2CH_2CH_2O$—$_nH$, where n has an average value of 12 to 15. This material is also a polyether. It also tends to the resilience of the elastomer. Both polyoxyethylene glycols and polyoxypropylene glycols are not useful in the elastomer, because of their inferior resilience characteristics, and inferior oxidative stability at moderate and elevated temperatures. Polyesters cannot be used because of their inferior hydrolytic stability.

A low molecular weight triol, having from 5 to 8 carbon atoms, selected from the group consisting of trimethylol pentane, trimethylol butane, trimethylol ethane and preferably trimethylol propane, is used to improve cure and shorten mold dwell time. The preferred trimethylol propane $C_2H_5(CH_2OH)_3$, has all three hydroxymethyl groups attached to the same carbon atom. Materials that cannot be used for this purpose include, for example, glycerol, and other polyols containing secondary and tertiary hydroxyl groups, which impart inferior thermal and hydrolytic stability. The use of the specific materials heretofore described as useful, is critical in providing effective resilience and high modulus in the elastomer, and substitution will severely degrade the final product.

In preparing the urethane prepolymer, the 4,4'-diphenylmethane diisocyanate (MDI) is melted, if stored in a frozen condition, and brought up to a temperature of between about 40° C. and 50° C. It is then placed in a kettle with an agitator, under a blanket of dry nitrogen gas. With the kettle agitator running, the triol is added to the kettle. Polyoxytetramethylene glycol is melted, if stored in frozen condition, and brought up to a temperature of between about 20° C. and 50° C., after which it is added to the stirred material in the kettle, at such a rate that the temperature of the reacting material does not exceed 75° C. The contents of the kettle are then stirred under dry nitrogen at 70° C. to 80° C. for about 1 hour, to form a polyurethane prepolymer. The prepolymer is then degassed for up to about 5 minutes at about 5 Torr/70° C. to 80° C. The polyurethane prepolymer can then be stored at low temperature, as long as it is not permitted to come into contact with ambient air, because it reacts with moisture.

Hydroquinone di-($\beta$-hydroxyethyl) ether (HQEE) is used as the sole chain extender. The aromatic structure of this material gives the elastomer a high modulus, while allowing the use of polyurethane prepolymer systems that don't have an extremely low isocyanate equivalent weight. This material also provides low shrinkage properties. The use of a single extender adds to the simplicity and commercial viability of the process. Materials such as ethylene glycol, propylene glycol, and the various isomeric butanediols, pentanediols, and hexanediols, and the like, are not suitable because they require use of a lower urethane equivalent weight polyurethane prepolymer, than if HQEE was used, to obtain a comparable modulus. These materials also cause a greater exothermic heat of reaction, that causes reproducibility problems, along with greater shrinkage and resultant cracks. Even hydroquinone, by itself is not useful in the elastomer, because its aromatic hydroxyl groups impart inferior thermal and hydrolytic stability.

In order to add the HQEE, used as a chain extender, to the polyurethane prepolymer, the HQEE is brought up to a temperature of between about 140° C. and 150° C., and then degassed at under about 5 Torr for about 5 minutes. It is then dropped to a temperature of between about 123° C. and 127° C. Concurrently, the polyurethane prepolymer, made as heretofore described, is brought up to a temperature of between about 110° C. and 115° C. and degassed at under about 5 Torr for about 6 minutes. It is then dropped to a temperature of between about 98° C. and 102° C., at all times being protected from atmospheric moisture.

The HQEE, which is between about 120° C. and 130° C., is then thoroughly mixed with polyurethane prepolymer, which is between about 100° C. and 120° C. If the HQEE temperature is below 120° C., there will be a lack of homogeneity in the mixture and HQEE may precipitate. If the HQEE temperature is over 130° C., the modulus of the cured elastomer will be lowered. If the prepolymer temperature is under 100° C., mold dwell time will be very long. If the prepolymer temperature is over 120° C., the modulus of the cured elastomers will be lowered.

Mixing can be performed with a casting machine or with an air or electric-powered mixer. Thorough mixing can be accomplished in about 1 to 5 minutes, with the resultant mixture being essentially free of bubbles and striation lines. Immediately after mixing, the admixture is poured into appropriate molds which have been coated with a mold release agent and are at a temperature of between about 100° C. and 120° C. The structural member is then demolded after about 1 to 2 hours and placed in a curing oven at a temperature of between about 100° C. and 120° C. for about 12 to 18 hours. Thus, mold dwell time is very short and eliminates the high cost of procuring a large number of molds in commercial operation.

Regarding the component materials, the 4,4'-diphenylmethane diisocyanate (MDI) preferably should have an average isocyanate equivalent weight of about 125, and have a maximum total chlorides content of about 0.1%. The triol preferably should have a minimum hydroxyl content of about 37.5% and a maximum water content of about 0.05 wt. %. The polyoxytetramethylene glycol preferably should have a weight average molecular weight of about 975 to 1,020, a hydroxyl number of between about 110 to 115, a maximum acid number of about 0.05, and a maximum water content of about 0.03 wt. %. The hydroquinone di-($\beta$-hydroxyethyl) ether (HQEE) preferably should have a hydroxyl number (mg KOH/gram) of between about 545 to 566, and a water content of less than about 0.1 wt. %.

The polyurethane prepolymer is prepared by admixing about 3.10 to about 3.40 moles of 4,4'-diphenylmethane diisocyanate with about 0.22 to about 0.32 mole of triol, i.e., preferably trimethylol propane, per 1.0 mole of polyoxytetramethylene glycol. This admixture must contain excess diisocyanate, which remains unreacted. The prepolymer has a typical % NCO end group content of about 8.1. The corresponding equivalent ratio of (diisocyanate NCO):(glycol OH):(triol OH) is from about (3.1 to 3.4):(1.0):(0.35 to 0.45). If more than 3.4 diisocyanate NCO equivalents per 1 glycol OH equivalent are used, the elastomer will exhibit brittleness under dynamic conditions that would be experienced during a missile launch. If less than 3.1 diisocyanate NCO equivalents per 1 glycol OH equivalent are used, the modulus of the elastomer drops substantially, allowing possible inversion of the seals which has a deleterious effect on the launch. These addition ranges are critical in providing the right degree of modulus, together with adequate resilience.

Then, from about 5.0 to about 5.4 parts by weight of polyurethane prepolymer, containing free isocyanate, is mixed with 1.0 part by weight of hydroquinone di-($\beta$-hydroxyethyl) ether (HQEE), where the equivalent weight of HQEE is about 99.1 and the prepolymer has an equivalent weight of about $4200/8.1 = 518.5$. Under about 5.0 parts polyurethane prepolymer per part HQEE, the resulting elastomer will be soft with a low modulus. Over about 5.4 parts of polyurethane prepolymer per part HQEE, the resulting elastomer's physical properties will range from brittleness, to cheesiness and softness. The corresponding equivalent ratio of (prepolymer NCO):(extender OH) can vary from about (0.97 to 1.10):(1.0). This range is critical in providing the right degree of modulus, together with adequate resilience.

Referring now to FIG. 1 of the Drawings, directed to missile mounted shock pads and pressure seals, a missile launch tube 10 is shown, surrounding a cylindrical launchable missile 11 contained in the tube at rest, and supported against the bottom of the tube by suitable supports 12. Shock isolator pads, shown as 13, are attached circumferentially around the outer missile surface on separable i.e., ejectable, base plate segments snugly fitting around the missile, and contact the launch tube bore. The isolator pads can be any number of configurations of a prebuckled box design well known in the art. This elastomeric liner material must support the missile in an aligned position, provide shock mitigation, react properly with the missile during launch, and provide vibration-isolation properties compatible with the missile response characteristics.

The launch seals, shown as 14, are attached circumferentially around the outer missile surface on separable, i.e., ejectable, base ring segments snugly fitting around the missile, near the bottom firing end 16 of the missile. Both of these structural members span the annular space between the missile and the launch tube and contact both the missile and the launch tube. The launch seals 14 must exhibit resiliency and sufficient rigidity and strength to retain eject gases during launch, yet must not exert excess frictional drag on the launch tube. As shown, the beam extension 15 of the seal, having a top low pressure side and a bottom high pressure side, points downward toward the firing end of the missile. The seal can be segmented by various means about its circumference to prevent undue compressive buckling while loading the missile.

It is to be understood that both the shock isolator pads and launch seals may also be attached to the launch tube that surrounds the missile, presenting a reusable system. There, the missile exits the launch tube, the pads and seal remain, and a new missile may be inserted without changing either the pads or seals. In the missile mounted system shown, both the pads and seals lift off with the missile and are jettisoned by a suitable ejection means after the missile clears the launch tube.

Figure 2:
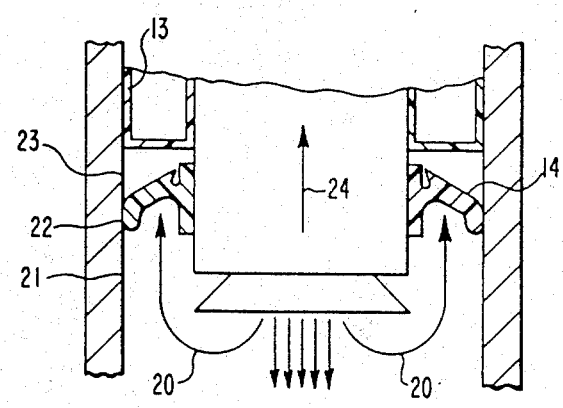
FIG. 2 shows the missile of FIG. 1 during launch with the high differential pressure present deflecting the missile launch seals.

FIG. 2 shows the distortion to the launch seals 14 during lift off by eject gases 20. As shown, the end of the launch seal, originally at point 21 on the launch tube has been pushed to point 22. Further distortion beyond point 23 would cause inversion of the seal, allowing escape of eject gases and loss of lift off force 24. A more complete description of the launch seal structure and distortion process can be found in U.S. Pat. No. 4,033,593, herein incorporated by reference. Eject gases are shown exiting primarily downward from the missile, but can alternatively be supplied by a lift off gas or steam generator at the bottom of the launch tube which would provide direct upward eject forces independent of the missile propulsion system.

Figure 3:
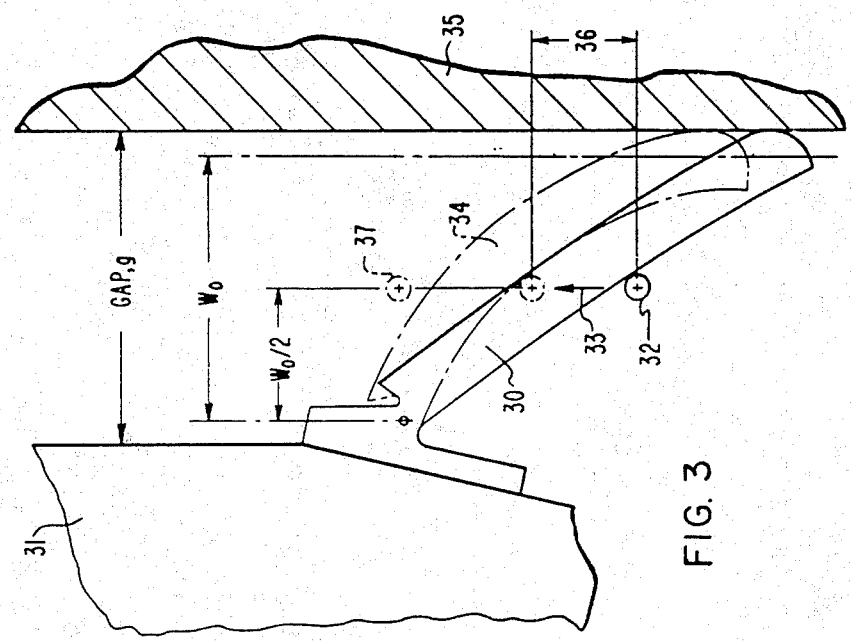
FIG. 3 shows a schematic representation of the seal segment Pull-Through Test, carried out in the Example.

FIG. 3 shows a device used in the Example to measure the simulated distortion forces on the launch tube seal by the eject gases, as shown in FIG. 2 of the drawings. Pull-through resistance is the most critical property measured on laboratory samples of the launch seal or on production segments sampled for quality control purposes. It is a measure of the primary function of the elastomeric seal, that of retaining gas pressure during missile launch. The Pull-Through Test, which is well known in the art, was designed to simulate the pressure loading at missile launch, by using a localized line load to deform a seal segment test samle held in a special fixture. An Instron machine is usually used, which produces an autographic record of load versus seal segment displacement.

It has been found that the pressure capacity of a two-foot diameter test seal is related to the pull-through test load by the equation:

$$p = (1.75\ P)/(bW_o),$$

where p = pressure, lb./sq.in.
P = pull-through load, lb.
b = segment width, in.
$W_o$ = effective gap, in.

The tests were conducted on 1.49 inch wide, 0.73 inch thick radial strips of elastomeric seal 30, bonded to a steel mounting plate 31, where a loading pin 32 exerts an upward pull-through load 33, causing pin displacement and seal distortion, to seal position 34 and upward. This presses the seal against the launch tube side 35 of the test apparatus. The pin displacement 36 is also shown, its rate is usually about 5 inches/min. Pin displacement 36 causing seal distortation 34 shown, constitutes only a fraction of the total loading of the Pull-Through Test. At maximum loading the pin 32 will be approximately at position 37.

EXAMPLE

A polyurethane prepolymer was made by mixing 1,843 grams (7.36 moles, 14.72 NCO equivalents) of 4,4'-diphenylmethane diisocyanate at about 45° C. with about 83 grams (0.618 mole, 1.85 OH equivalents) of trimethylol propane in an agitated kettle under a blanket of dry nitrogen gas. Then about 2,296 grams (2.30 moles, 4.60 OH equivalents) of polyoxytetramethylene glycol (sold commercially by Quaker Oats Co. Chemical Div. as QO Polymeg 1000) at a temperature of about 45° C. was added to the kettle mixture, at such a rate that the kettle temperature did not exceed 75° C. After addition, the admixture was stirred at about 75° C. for 1 hour to form a polyurethane prepolymer. The % NCO was about 8.1. The mole ratio of (diisocyanate):(glycol):(triol) was (7.36):(2.30):(0.618) or (3.2):(1.0):(0.267). The corresponding equivalent ratio of (diisocyanate NCO):(glycol OH):(triol OH) was (14.72):(4.6):(1.85) or (3.2):(1):(0.403).

The polyurethane prepolymer was then heated and degassed, and hydroquinone di-($\beta$-hydroxyethyl) ether was also heated and degassed. Then 178.2 grams (1.8 OH equivalents) of the hydroquinone di-($\beta$-hydroxyethyl) ether, at about 125° C., was thoroughly mixed with 938 grams (1.8 NCO equivalents) of the polyurethane prepolymer, at about 100° C., in a one-half gallon cylindrical container with a stirrer driven by an air motor for about 1 minute, with the resultant elastomeric mixture being essentially free of bubbles and striation lines. The weight ratio of (prepolymer):(extender) was (938 parts):(178.2 parts) or (5.24):(1.0). The corresponding equivalent ratio of (prepolymer NCO):(extender OH) was (1.0):(1.0).

the elastomeric mixture was then immediately poured into a 10" wide seal segment mold, made of aluminum coated with silicon mold release agent. The mold temperature was about 110° C. After two hours, the formed seal segment was demolded and post-cured for an additional 16 hours in an oven at 110° C. The peak exotherm of the composition was about 150° C. After several days at ambient conditions, several 1½" wide segment specimens were cut from the 10" wide polyurethane elastomer casting, for pull-through testing. These were designated as Sample (A) specimens. The castings had the shape substantially shown as seal 30 in FIG. 3 of the Drawings.

Figure 4:
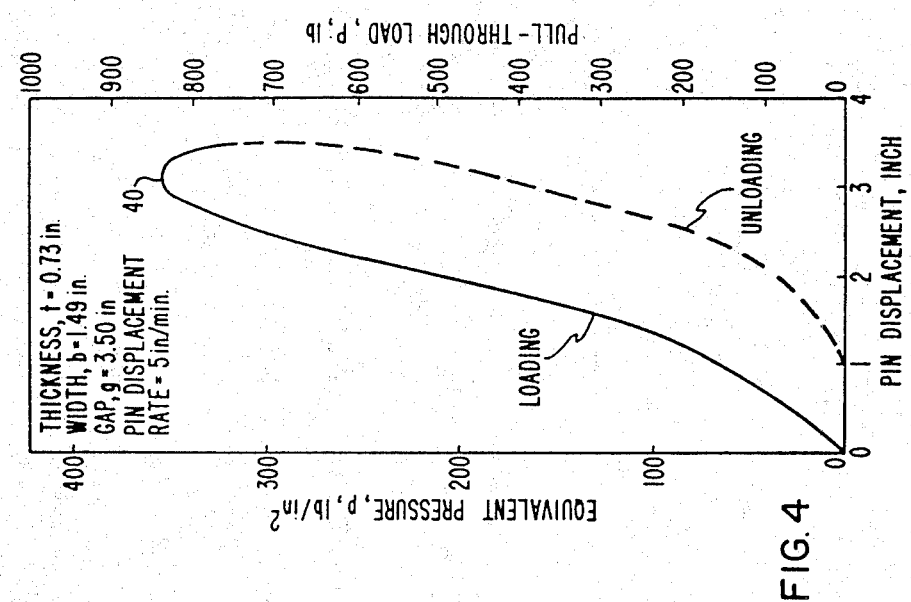
FIG. 4 shows an autographic record of the Pull-Through Test carried out in the Example.

The castings were bonded to steel mounting plates with epoxy adhesive and the adhesive was allowed to cure for about 48 hours. An Instron machine (20 kip. capacity screw driven apparatus, model No. FD, manufactured by Instron Corp.) was used and an autographic record of load versus displacement was made. The seal specimens were loaded into the test fixture which had been set for a 3.5 inch gap. A load was then applied to the specimen at a constant crosshead rate (pin rate) of 5 in./min., at a test temperature of about 23° C. After the peak load was reached, the crosshead direction was reversed to the starting position. FIG. 4 of the Drawings shows the autographic record generated by the Instron machine. The peak load from the loading cycle, point 40, was used to compute the pressure values shown.

As can be seen from FIG. 4, an equivalent first cycle pressure of 345 lb./sq.in. was reached, equivalent to a peak load of about 830 pounds, for a 3.50 inch gap. As a comparison, seals made with tolylene diisocyanate terminated polyoxytetramethylene based prepolymers, such as Adiprene L-167, extended with MOCA, usually peak in the same test on the first cycle at about 700 to 830 pounds, for a much smaller 2.55 inch gap. The test results show that the launch seal elastomeric segments have a combination of outstanding resilience and high modulus, where the sharp slope of the curve indicates high stiffness or rigidity. Not only is this polyurethane elastomer an outstanding material for launch seals, but it is also useful for other structural members such as shock isolator pads, which would utilize thin structural strut crossmembers. Additional properties measured included a Shore Hardness A/D of 97/62, a Tensile Stress at 100 % elongation of 3,038 lb./sq.in. and an Utilmate Elongation of 245 %.

Some compartive samples were made using the same formulation and Pull-Through Test as described heretofore, except that the equivalent ratio of (diisocyanate NCO):(glycol OH) was (3.0):(1). This specimen was designated as Sample ($C_1$) and its pull-through load P in the Pull-Through Test was only about 7/10 of the Sample (A) pull-through load. Again, the same formulation and Pull-Through Test as described heretofore was used, except that the equivalent ratio of (prepolymer NCO):(extender OH) was (0.85):(1). This specimen was designated as Sample ($C_2$) and its pull-through load in the Pull-Through Test was only about 8.6/10 of the Sample (A) pull-through load.

We claim:

1. A high modulus polyurethane elastomeric article, comprising the cured admixture of:
   (A) about 0.97 to about 1.10 NCO equivalents of a polyurethane prepolymer prepared from a composition consisting essentially of:
   (1) about 3.1 to about 3.4 NCO equivalents of 4,4'-diphenylmethane diisocyanate,
   (2) about 0.35 to about 0.45 OH equivalents of a low moleculer weight triol selected from the group consisting of trimethylol ethane, trimethylol propane, trimethylol butane, trimethylol pentane and mixtures thereof, and
   (3) about 1.0 OH equivalent of polyoxytetramethylene glycol, with
   (B) 1.0 OH equivalent of hydroquinone di-($\beta$-hydroxyethyl) ether; said elastomeric article characterized as being resilient, strong and crack resistant, and having a high rigidity.

2. A high modulus polyurethane elastomer structural member, comprising the cured admixture of:
   (A) about 5.0 to about 5.4 parts by weight of a polyurethane prepolymer prepared from a composition consisting essentially of:
   (1) about 3.10 moles to about 3.40 moles of 4,4'-diphenylmethane diisocyanate,
   (2) about 0.22 mole to about 0.32 mole of a low molecular weight triol, selected from the group consisting of trimethylol ethane, trimethylol propane, trimethylol butane, trimethylol pentane and mixtures thereof, and
   (3) 1.0 mole of polyoxytetramethylene glycol, with
   (B) 1.0 part by weight of a hydroquinone di-($\beta$-hydroxyethyl) ether acting as a chain extender; said elastomer member characterized as being resilient, strong and crack resistant, and having a high rigidity.

3. A high modulus polyurethane elastomer structural member in circumferential contact with a launchable missile, comprising the cured admixture of:
   (A) about 5.0 to about 5.4 parts by weight of a polyurethane prepolymer prepared from a composition consisting essentially of:
   (1) about 3.10 moles to about 3.40 moles of 4,4'-diphenylmethane diisocyanate,
   (2) about 0.22 mole to about 0.32 mole of a low molecular weight triol selected from the group consisting of trimethylol ethane, trimethylol propane, trimethylol butane, trimethyl pentane and mixtures thereof, and
   (3) 1.0 mole of polyoxytetramethylene glycol, with
   (B) 1.0 part by weight of hydroquinone di-($\beta$-hydroxyethyl) ether acting as sole chain extender; said elastomer member characterized as being resilient, strong and crack resistant, and rigid.

4. The structural member of claim 3, where the triol is trimethylol propane.

5. The structural member of claim 3, mounted as a launch seal on a missile.

6. The structural member of claim 3, mounted as a launch seal on a launch tube surrounding a missile.

7. The structural member of claim 3, mounted as a shock isolator pad on a missile.

8. The structural member of claim 3, mounted as a shock isolator pad on a launch tube surrounding a missile.

9. The structural member of claim 3, wherein the triol is trimethylol propane having three hydroxy methyl groups attached to the same carbon atom, the prepolymer has about 8.1 % NCO, the weight ratio of prepolymer: chain extender is about 5.2:1, and the mole ratio of (diisocyanate):(triol):(glycol) is about (3.2):(0.26):(1.0).

10. The structural member of claim 3 attached to a launchable missile having a bottom firing end and disposed inside a launch tube, said structural member being a launch seal having a beam pointing downward toward the missile firing end, said seal beam circumferentially contacting the inside of the launch tube and being effective to retain gas pressure generated at the firing end of the missile.

11. The structural member of claim 9 attached to a launchable missile having a bottom firing end and disposed inside a launch tube, said structural member being a launch seal having a beam pointing downward toward the missile firing end, said seal beam circumferentially contacting the inside of the launch tube and being effective to retain gas pressure generated at the firing end of the missile.

* * * * *